(12) United States Patent
Capecelatro et al.

(10) Patent No.: US 11,594,868 B1
(45) Date of Patent: Feb. 28, 2023

(54) SMALL ARCHITECTURAL DISTRIBUTED PREMISES AUTOMATION

(71) Applicant: Josh.ai, Inc., Denver, CO (US)

(72) Inventors: Alex Nathan Capecelatro, Los Angeles, CA (US); Timothy Earl Gill, Denver, CO (US); Brian Hulme, Morrison, CO (US); Edward John McKenna, Jr., Denver, CO (US); Derek Murphy, Highlands Ranch, CO (US); Scott Lon Allen, Denver, CO (US)

(73) Assignee: Josh.ai, Inc., Denver, CO (US)

( * ) Notice: Subject to any disclaimer, the term of this patent is extended or adjusted under 35 U.S.C. 154(b) by 0 days.

(21) Appl. No.: 17/231,406

(22) Filed: Apr. 15, 2021

Related U.S. Application Data

(60) Provisional application No. 63/012,911, filed on Apr. 20, 2020.

(51) Int. Cl.
  *H02G 3/22* (2006.01)
  *H04L 12/10* (2006.01)
  *E04F 13/074* (2006.01)
  *H04L 12/28* (2006.01)

(52) U.S. Cl.
  CPC ............ *H02G 3/22* (2013.01); *E04F 13/074* (2013.01); *H04L 12/10* (2013.01); *E04F 2290/02* (2013.01); *H04L 2012/2849* (2013.01)

(58) Field of Classification Search
  CPC ... H02G 3/22; H04L 12/10; H04L 2012/2849; E04F 2290/02
  See application file for complete search history.

(56) References Cited

U.S. PATENT DOCUMENTS

| | | | | |
|---|---|---|---|---|
| 4,304,079 A * | 12/1981 | Thorsten | ................. | H02G 3/22 52/220.2 |
| 6,133,843 A * | 10/2000 | Davidson | ............... | G08B 7/062 340/693.11 |
| 6,250,162 B1 * | 6/2001 | Amaike | .................. | G10K 9/22 310/334 |
| 10,078,786 B2 * | 9/2018 | Richardson | ............ | G06V 40/13 |
| 11,060,705 B1 * | 7/2021 | Danesh | .................. | F21V 17/10 |
| 2003/0043883 A1 * | 3/2003 | Okuzono | ............... | G01N 25/04 374/139 |
| 2003/0159910 A1 * | 8/2003 | Caldwell | ............... | A47F 5/0043 200/310 |
| 2003/0210551 A1 * | 11/2003 | Sevack | .................. | F21V 17/162 362/365 |
| 2007/0268506 A1 * | 11/2007 | Zeldin | ................. | H04L 41/0806 358/1.13 |
| 2009/0056264 A1 * | 3/2009 | Rosskamp | ............ | E06B 3/6675 52/456 |

(Continued)

*Primary Examiner* — Stephen J Clawson
(74) *Attorney, Agent, or Firm* — Van Pelt, Yi & James LLP

(57) ABSTRACT

A power module is configured to accept power from a cable, wherein the power module may be inserted into a standard wall cavity via a small hole. A processor module coupled to the power module comprises a processor and is configured to accept power from the cable for the processor, wherein the processor module may be inserted into the standard wall cavity via the small hole. A sensor module coupled to the processor module, comprises a sensor and is configured to accept input from the sensor for the processor, wherein the sensor module may be inserted into the small hole.

24 Claims, 9 Drawing Sheets

(56) References Cited

U.S. PATENT DOCUMENTS

| | | | | |
|---|---|---|---|---|
| 2010/0148028 A1* | 6/2010 | Hand | ............... | E04B 9/006 |
| | | | | 248/330.1 |
| 2015/0264780 A1* | 9/2015 | Harris | ............... | H05B 45/12 |
| | | | | 315/297 |
| 2017/0229811 A1* | 8/2017 | Clark | ............... | H01R 24/64 |
| 2018/0116036 A1* | 4/2018 | Snyder | ............ | H05B 47/185 |
| 2019/0064914 A1* | 2/2019 | Krishnakumar | ...... | G06F 1/263 |

\* cited by examiner

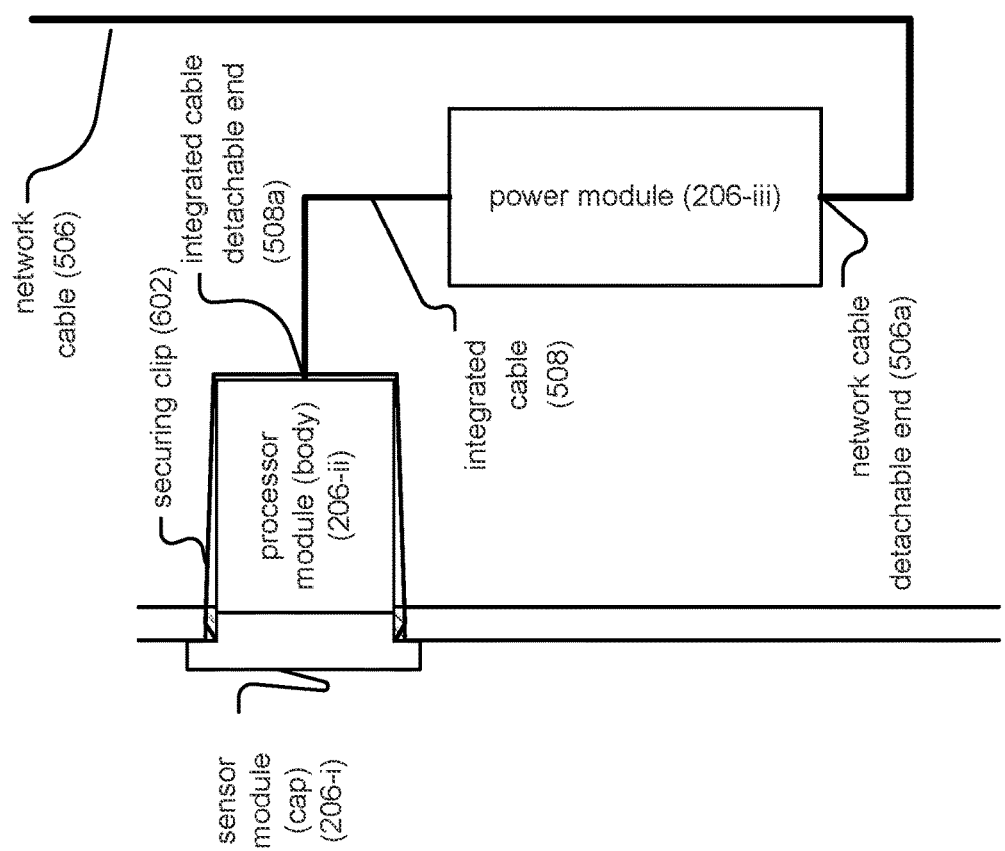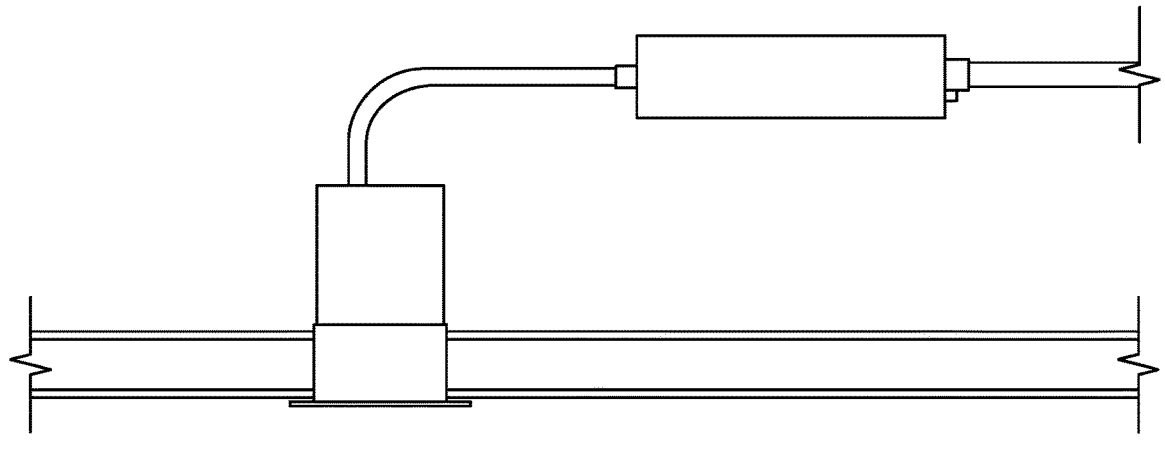

SMALL ARCHITECTURAL DISTRIBUTED PREMISES AUTOMATION

CROSS REFERENCE TO OTHER APPLICATIONS

This application claims priority to U.S. Provisional Patent Application No. 63/012,911 entitled SMALL MODULAR DISTRIBUTED HOME AUTOMATION filed Apr. 20, 2020 which is incorporated herein by reference for all purposes.

BACKGROUND OF THE INVENTION

One use for technology is to establish a system of control. In premises automation, for example home automation, a system controls various aspects of the premises such as lighting, music, and heating, ventilation and air conditioning (HVAC) based in part on user input. Premises are architected to be livable spaces for humans, which include architectural and aesthetic design to appeal and be compatible with humans. Without an architecturally acceptable system, some designers may only rely on manual or simplistic control of the premises, which may be overwhelming, confusing, and/or time consuming for a manual operator. Thus, it would be an improvement to have architecturally compatible ways to provide premises automation.

BRIEF DESCRIPTION OF THE DRAWINGS

Various embodiments of the invention are disclosed in the following detailed description and the accompanying drawings.

FIG. 6A is a block illustration of an example of an installed small architectural premises automation device.

FIG. 6B is a rendered illustration of an example of an assembled small architectural premises automation device in a wall.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A small architectural distributed system for premises automation is disclosed. By being small and/or modular, the system is more architecturally and/or aesthetically appropriate by being more discrete. Modularizing premises automation system elements such as power delivery, processing, and sensing to fit in typical homes, for example typical walls, is disclosed. In one embodiment, the system includes an audio system. An audio system may include modular microphones and/or an efficient integration with existing/new distributed premises sound systems, including smart sound systems. Audio systems may be important for premises automation for simple and intuitive control, for example having a user state out loud "please turn off the master bedroom lights at 8 pm tonight" and/or a system responding "got it, lights in the master bedroom will be turned off in a couple hours." Premises automation also includes controlling audio systems such as music and/or television audio channels.

Figure 1:
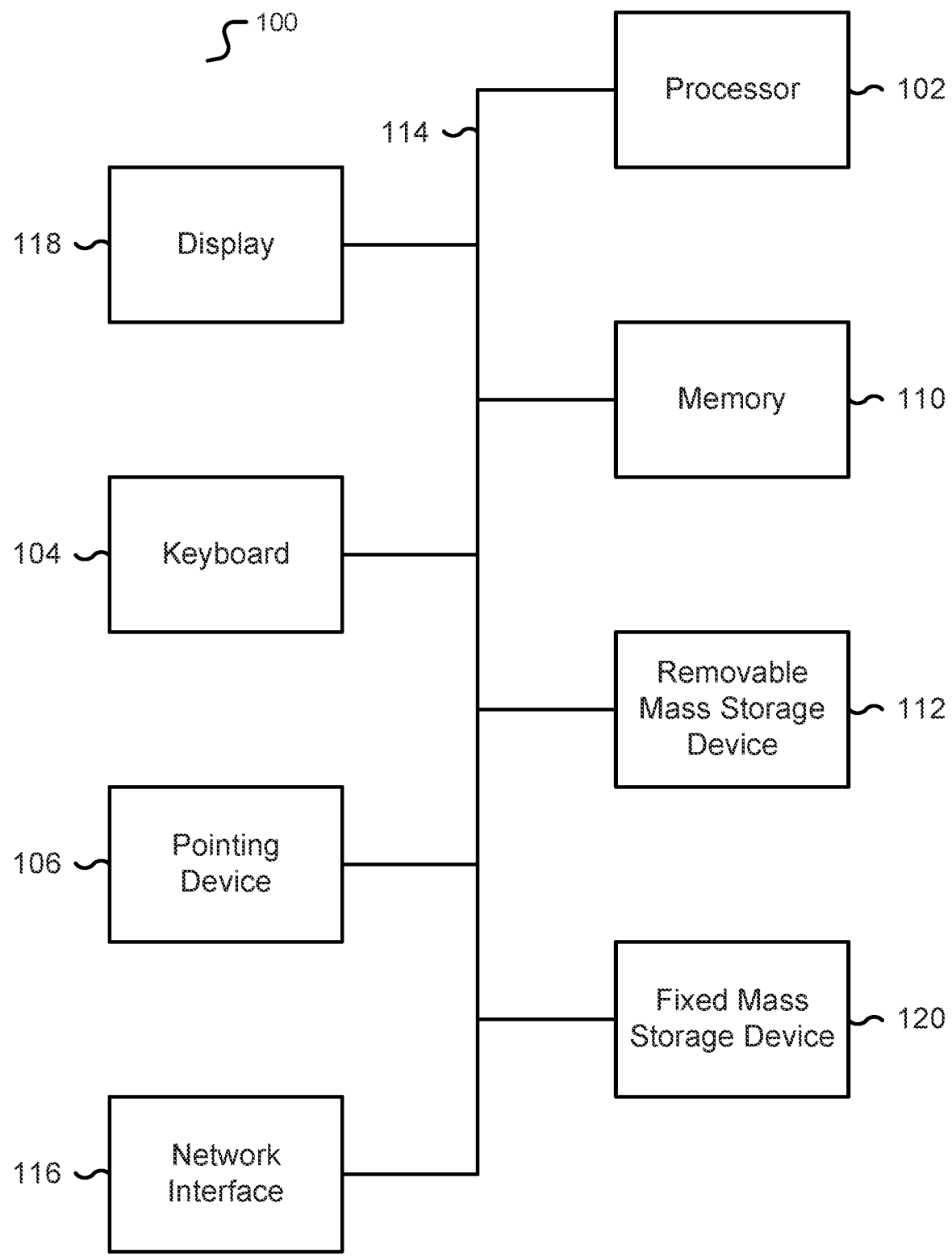
FIG. 1 is a functional diagram illustrating a programmed computer/server system for control of complex input in accordance with some embodiments.

FIG. 1 is a functional diagram illustrating a programmed computer/server system for control of complex input in accordance with some embodiments. As shown, FIG. 1 provides a functional diagram of a general-purpose computer system programmed to provide premises automation in accordance with some embodiments. As will be apparent, other computer system architectures and configurations can be used for premises automation.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio input device, audio card, speakers, a touch (or pointing) device, and/or other subsystems as needed. Besides a touch screen, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
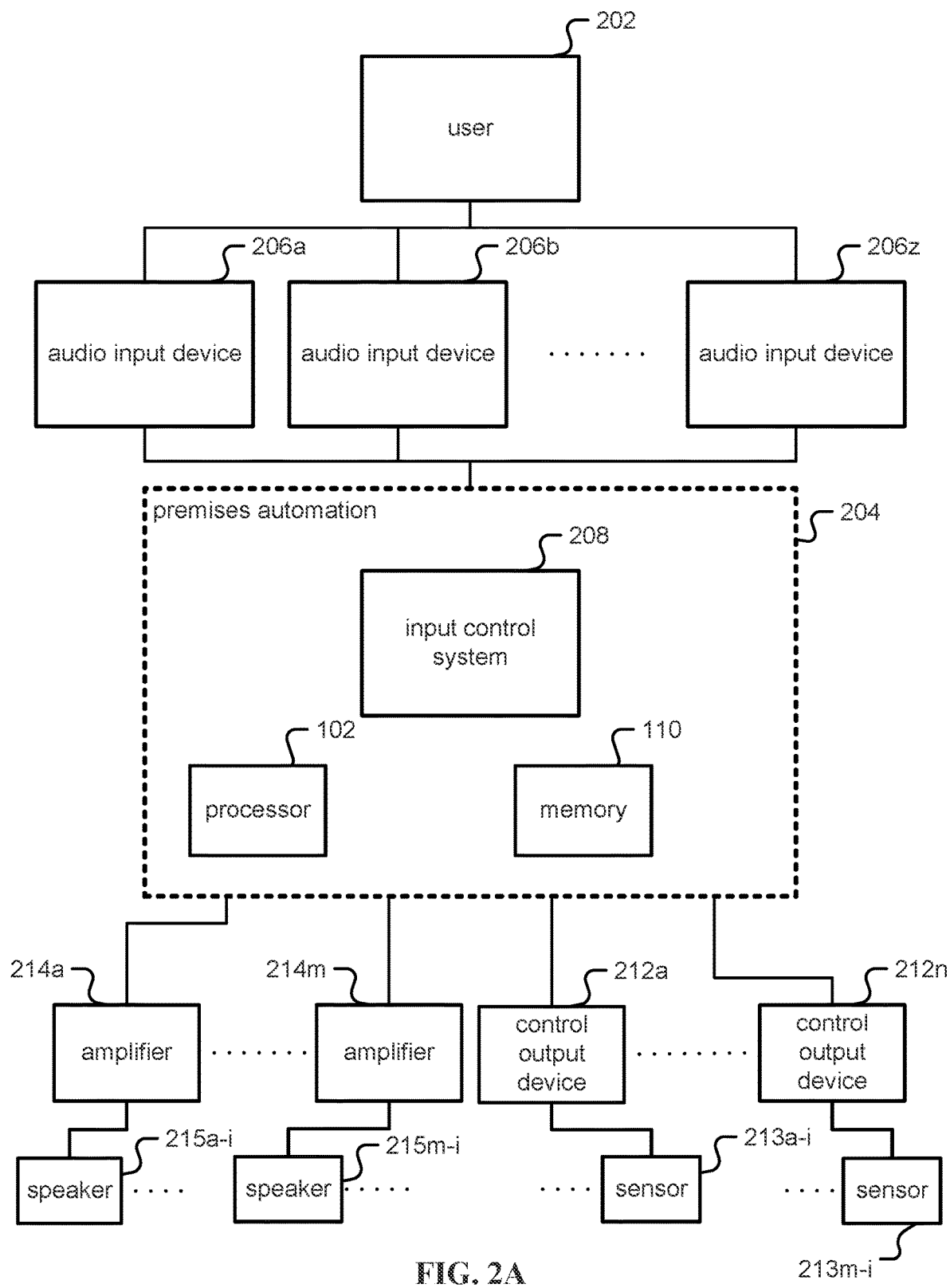
FIG. 2A is a block diagram illustrating an embodiment of a system for premises automation.

FIG. 2A is a block diagram illustrating an embodiment of a system for premises automation. User (202) is coupled to premises automation system (204), either through distributed audio/sensor input devices (206), here shown with three devices (206*a*), (206*b*), and (206*z*), if by way of speech, or directly to the input control system (208) if by way of written word, for example by typing or texting on an associated app.

In one embodiment, premises automation system (204) is a computer system as shown in FIG. 1 and includes processor (102) and memory (110). In one embodiment, the premises automation system (204) is a mobile phone, computer, or dedicated smart home device. Without limitation, throughout this specification the dedicated smart home device referenced herein as a "core" device is illustrated as the premises automation system (204). In one embodiment, a physical, phone, touchscreen, swipe-based keyboard and/or virtual keyboard (104) is included for typing or texting. The audio/sensor input device(s) (206) may be coupled and/or part of the input control system (208) as well.

After interpreting programming, the input control system (208) may be coupled to one or more control output devices (212), here shown with three devices (212a), (212b), and (212z). The control output devices (212) may be a single smart home hub (212a) and/or may include additional smart home devices for direct control. One or more sensors (213) may be part of any control output device (212).

To cue feedback from premises automation core (204) to the user giving speech commands to one or more of the audio/sensor input devices (206) an existing distributed network of speakers (215) may be used by interfacing with an existing set of associated amplifiers (214). Premises automation core (204) may also playback music and/or television/media audio through the existing set of speakers and/or smart speakers (215). Thus if a user says "Josh, what time is it?" to one of the input devices (206), the core (204) may detect which room the user is speaking in and direct the answer "It's noon, Dave." to the set of speakers (215) in said room.

Figure 2B:
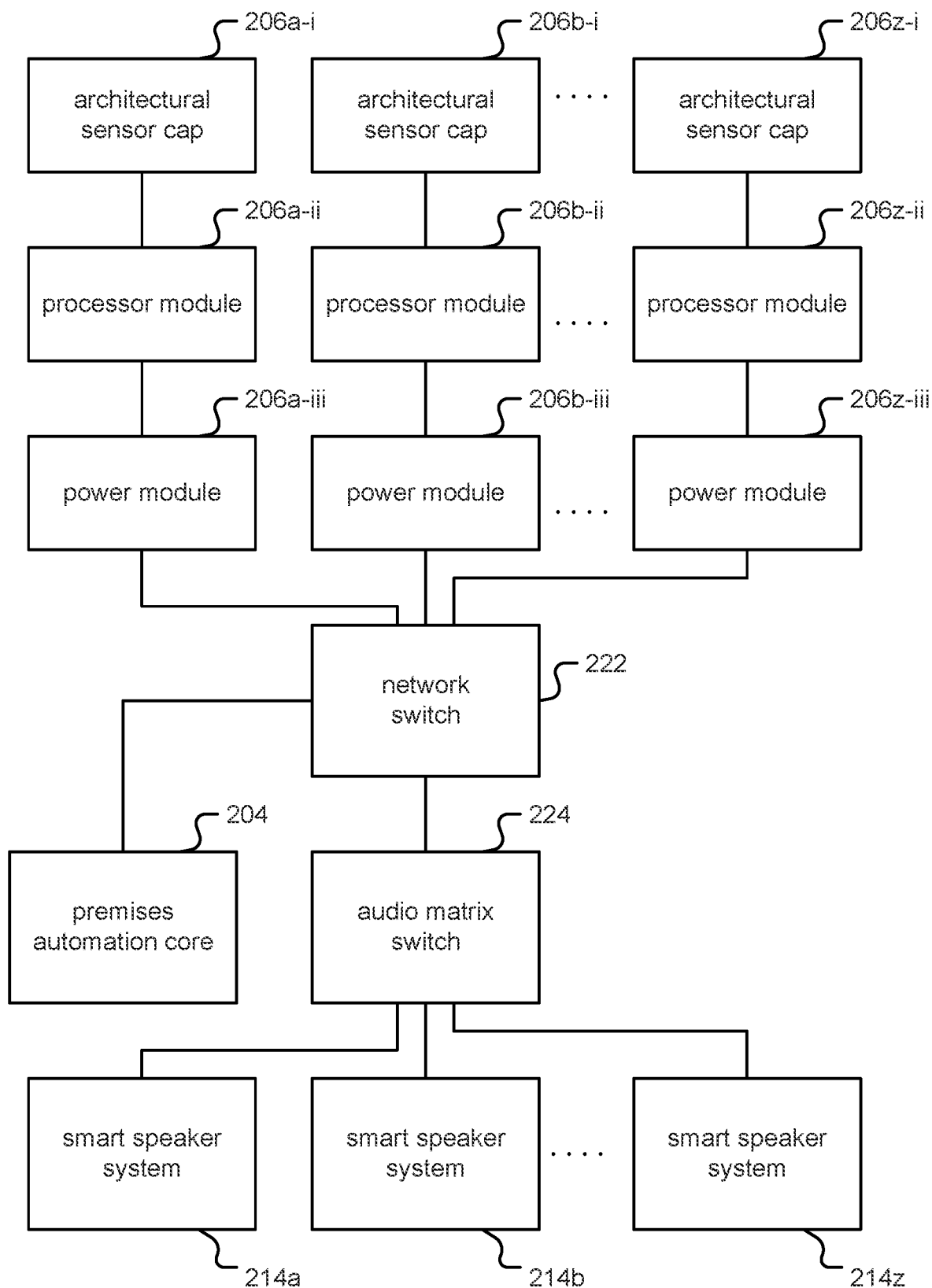
FIG. 2B is block diagram illustrating an embodiment of an audio system for premises automation recommendations.

FIG. 2B is block diagram illustrating an embodiment of an audio system for premises automation recommendations. In one embodiment, the audio system in FIG. 2B is at least part of the system in FIG. 2A to provide feedback to speech commands and/or provide music or media audio as a result of said speech commands.

An improvement for premises automation system is having a large number of distributed audio/sensor input devices (206) so as to permit a user to communicate with the premises automation system from any region of the premises. In order to minimize construction costs and in order to maximize aesthetic compatibility with most rooms of a residential/commercial/industrial premises, the audio/sensor input devices (206) are "modular" and/or small.

In one embodiment, a given audio/sensor input device (206a) is made up of an architectural microphone, wherein "architectural" is defined herein as a device with a low-profile that may be compatible with a broad aesthetic and suitable for nearly any room, for example a device less than 40 mm in length, less then 40 mm in width, and less than 4 mm thick.

In one embodiment, to fit discretely and efficiently in existing buildings/walls, the audio/sensor input device (206a) is modular, being made up of an architectural audio/sensor cap (206a-i) that is low-profile and in a given room, and a processor module/body (206a-ii) which is embedded within a wall/ceiling/floor and interfaces with the cap (206a-i) inside said wall/ceiling/floor. In one embodiment, the design is further modularized using a power module (206a-iii) which takes cable like PoE (Power over Ethernet)/CAT cable and handles power delivery to the processor module (206a-ii) and cap (206a-i). In one embodiment, the power module delivers signal to the processor module such as wired Ethernet, and in another embodiment, the processor module is powered to use a wireless network for signal, such as WiFi. The audio/sensor input device (206a) is modular in the sense that caps (206a-i) with other styles and functionality may be interchanged by a user once a construction team has embedded the audio device body (206a-ii) in a wall/ceiling/floor.

In one embodiment, the audio device bodies (206a-ii), (206b-ii), (206z-ii) are connected through a network connection, for example an Ethernet connection via the PoE coupling, to a network switch (222) or collection of network switches (222). In one embodiment, a network connection is via a wireless network technology such as WiFi. The network switch (222) is also coupled to a premises automation core (204), also shown in FIG. 2A, and an audio matrix switch (224). An audio matrix switch (224) allows configuration of one or more audio inputs to be connected to one or more audio outputs. The audio outputs from the audio matrix switch include one or more smart speaker systems (214), here shown to include three (214a), (214b), and (214z).

Figure 3A:
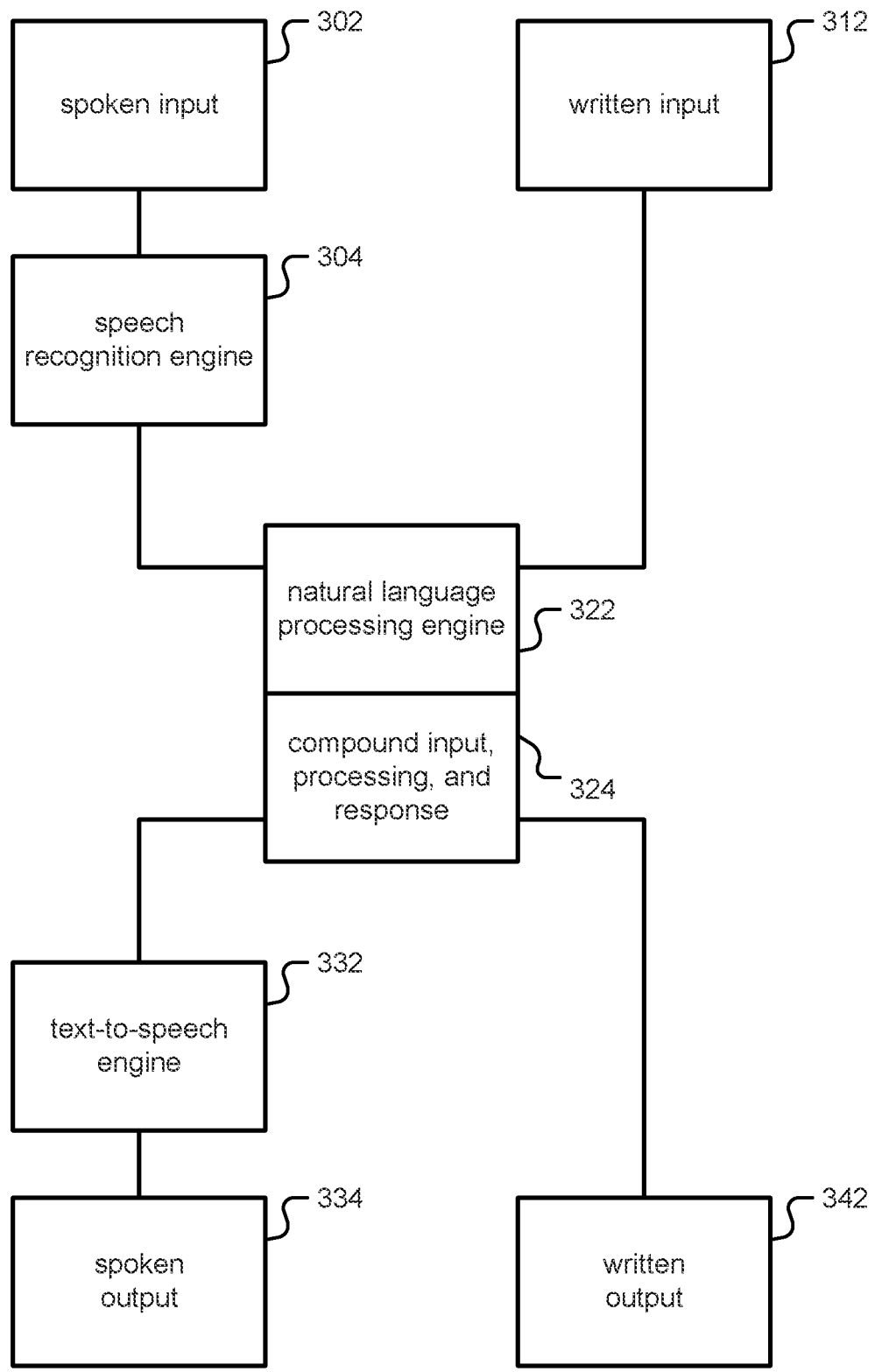
FIG. 3A is a block diagram illustrating an embodiment of a system for complex input speech and written processing.

FIG. 3A is a block diagram illustrating an embodiment of a system for complex input speech and written processing. In one embodiment, the system of FIG. 3A is at least part of the premises automation system (204) and/or control output device (212a) in FIG. 2A.

As FIG. 3A illustrates, input may be spoken and/or written, and output may be spoken and/or written. Spoken input (302) is processed by a speech recognition engine (304) before being passed to the natural language processing engine (322). Written input (312) may be processed directly by the natural language processing engine (322). In one embodiment, written input (312) may correct, add, edit, delete, the resultant input from spoken input (302) and speech recognition engine (304).

Note that in some cases, the spoken input (302) and/or written input (312) may have little or no punctuation, capitalization, and/or proper nouns recognized. Natural language processing engine (322) applies rules and couples the system for complex/compound input, processing, and response (324). User notification of responses includes written output (342) from system (324), and may include a text-to-speech engine (332) to provide spoken output (334) as well.

Figure 3B:
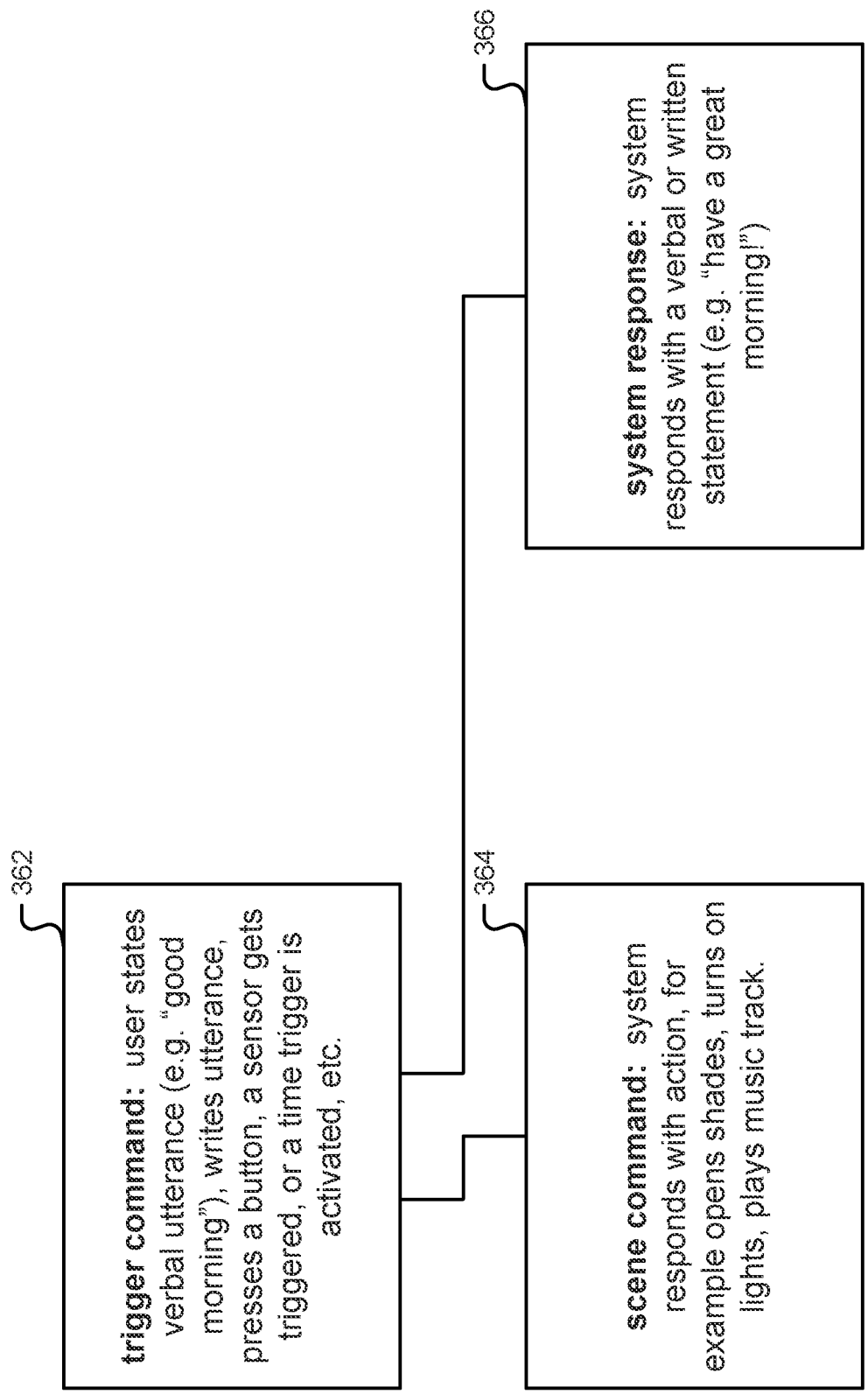
FIG. 3B is an illustration of a trigger and corresponding scene command.

FIG. 3B is an illustration of a trigger and corresponding scene command. In one embodiment, the illustration of FIG. 3B is carried out by the system (204) of FIG. 2.

Trigger command (362) is an action that triggers a scene. In the example of FIG. 3B, the action includes: a voice command, for example a user that says "Good morning"; a button press, for example a user that presses a button titled "Morning"; a triggered sensor; and/or a triggered time, for example based on a schedule.

After the system is triggered (362), the system may optionally respond with a "scene" command (364). Examples given in FIG. 3B include opening the shades, turning on the lights, and playing a musical track. A scene command, also referred to herein as a "premises automation scene", is a convenient way to refer to one or more aspects of premises automation. For example, a "good morning" command may include opening the shades, turning on the lights, and playing a musical track suitable for mornings because the user prefers to start their morning with these aspects of premises automation. After the system is triggered (362) a system response (366) may optionally be issued by responding with a written or verbal output, for example "Have a great morning!"

Figure 4A:
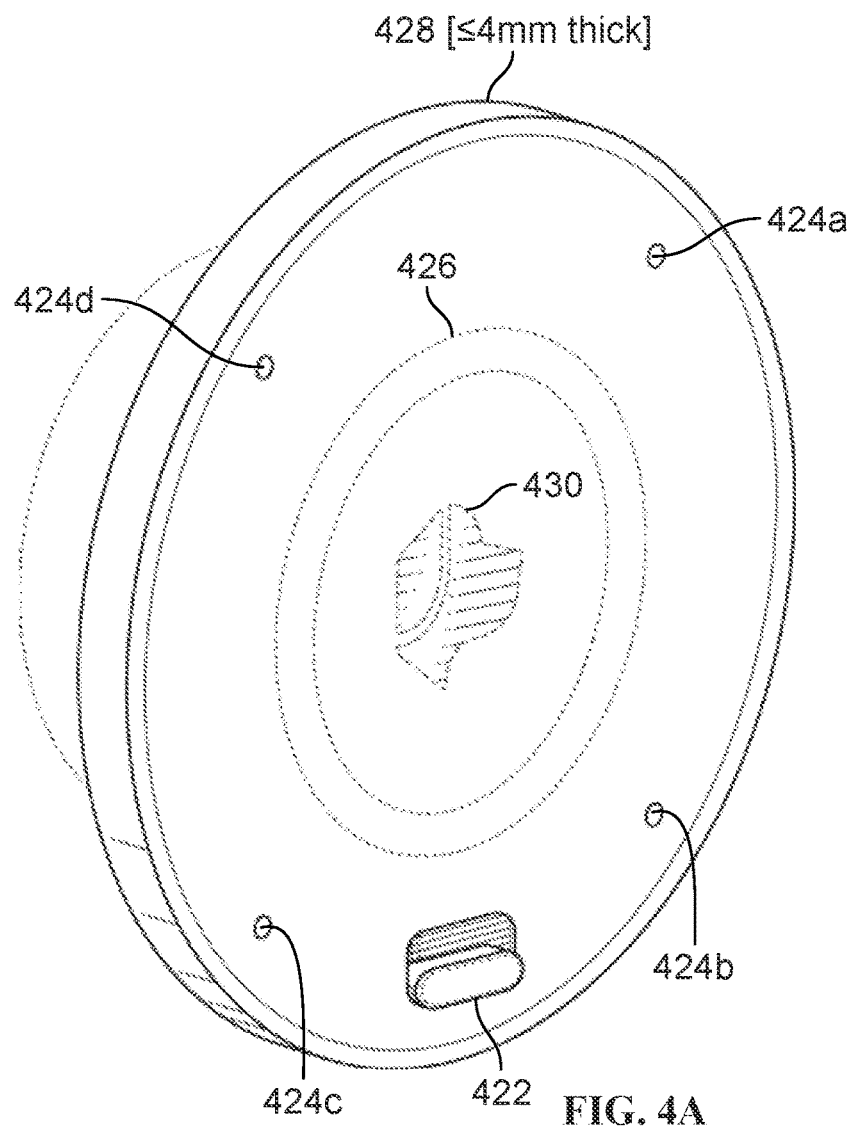
FIG. 4A is an illustration of an embodiment for an architectural microphone cap.

FIG. 4A is an illustration of an embodiment for an architectural microphone cap. In one embodiment, the illustration of FIG. 4A is depicted as component (206a-i), (206b-i), . . . (206z-i) in FIG. 2B.

The cap of FIG. 4 has one or more privacy switches (422). In one embodiment, the privacy switch (422) is a switch that assures users of privacy by disrupting a physical and/or electrical connection associated with the input of the cap, for example it electrical and/or physically disconnects all microphones and/or cameras. The cap also comprises at least one microphone (424), here shown as a microphone array of four microphones (424a), (424b), (424c), (424d). The cap may contain one or more cameras and/or light-sensing sensors (not shown in FIG. 4A).

In one embodiment, the cap includes an indicator for feedback such as contextual subsystem feedback, for example an LED or a multicolored LED ring (426). The LED may feedback by way of pulses, brightness or color hue. For example, if a user says "Josh, please turn the lights on", the LED may match a yellow hue to indicate the contextual subsystem is the lighting subsystem, and the lights may turn on. If the user subsequently says "Josh, turn it off" while the LED is yellow, the contextual subsystem may understand that the generic command to turn off is associated with the lights and turns off the lights. Similarly, if a user says "Josh, let's adjust the shades", the LED may match a magenta hue as representing the window shades contextual subsystem. The brightness of the LED may indicate a gradient, for example a gradient of dimness in lights. Thus, if a user says "Josh, please turn the volume to half" the LED which may be orange to indicate speaker volume as a contextual subsystem, and may be set to a half brightness than when the volume is at 100%.

In one embodiment, near the ring (426) is a capacitive touch button (430) or other button (430). This button may provide an additional input mechanism for the user. For example if the user says "Josh, turn on the lights", the LED may match a yellow hue to indicate the lighting as a contextual subsystem. If the user subsequently taps the capacitive touch button (430), the lights may turn off. Instead if the user subsequently holds the capacitive touch button (430), the lights may slowly dim lower until the user releases the capacitive touch button (430).

As described above, to improve usability of the cap in any room and improve aesthetics, the cap is designed to be low-profile, here shown to have a depth/thickness of 4 mm (428) from the finished building surface, for example 4 mm from the wall.

Figure 4B:
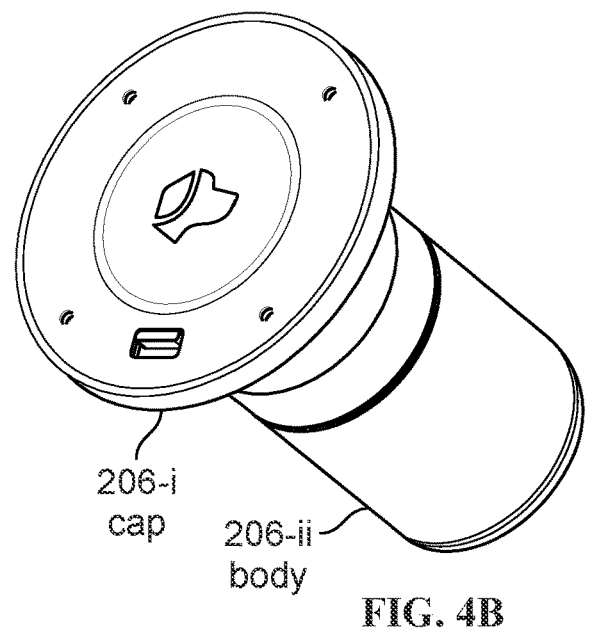
FIG. 4B is an illustration of an embodiment for an architectural microphone.

FIG. 4B is an illustration of an embodiment for an architectural microphone. In one embodiment, the cap (206-i) of FIG. 4B is also shown in FIG. 4A. As shown, the body (206-ii) is designed to allow interchange of cap (206-i) of various designs and functionality, and the body (206-ii) remains in the wall.

Figure 5:
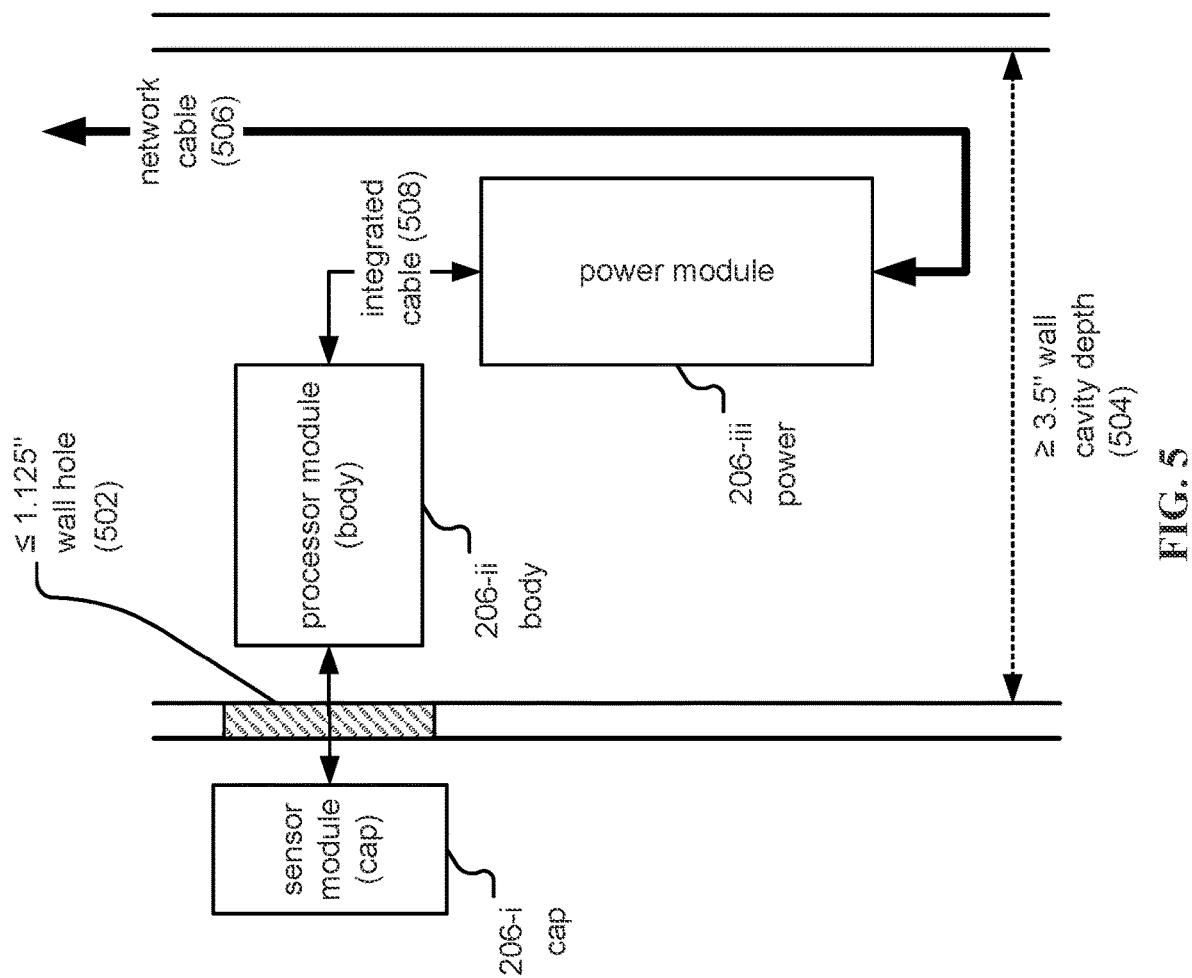
FIG. 5 is a block diagram illustrating an example of a small architectural premises automation device showing typical placement in a wall.

FIG. 5 is a block diagram illustrating an example of a small architectural premises automation device showing typical placement in a wall. Without limitation, the device of FIG. 5 may be placed in any element of a building/premises, for example a ceiling or a floor, and a wall is used in discussion of FIG. 5 for illustration purposes.

A construction/contractor may drill a small hole between 1 inch and 5 inches, such as a 1.125 inch hole in the wall (502), which is typically of a wall cavity depth of 3.5 inches or greater. The contractor may then fish or obtain a cable (506) and begin the installation process. First, a power module (206-iii) may be coupled to the cable (506). The power module (206-iii) may then be coupled to the processor module/body (206-ii), for example using an integrated data and power cable (508). In one embodiment, a USB-C cable (508) is used as a readily available, reasonably rugged, and standardized integrated data/power cable.

In one embodiment, a securing clip may be used to secure the integrated data and power cable (508) to the processor module (206-ii), with the other end of the cable (508) hardwired to the power module (206-iii). The same securing clip may also be used to secure the sensor module (206-i) and/or processor module (206-ii) in the hole (502) and/or wall (504), using for example a pressure fit. The sensor module/cap (206-i) may be attached through the hole (502) to processor module/body (206-ii) and plug in using a proprietary and/or standard plug and receptacle pairing, that may be user-accessible.

FIG. 6A is a block illustration of an example of an installed small architectural premises automation device. In one embodiment, the device of FIG. 6A is the assembled version of that of FIG. 5.

The detachable end (506a) of cable (506) is plugged into power module (206-iii), which has a hardwired integrated cable (508) with detachable end (508a) to be plugged into processor module/body (206-ii). As described herein, a securing clip (602) may secure the integrated cable end (508a) to the processor module (206-ii) and/or secure the processor module (206-ii)/sensor module (206-i) to the wall using a pressure fit. The sensor module (206-i) covers the hole (502) securely and provides input to the system. FIG. 6B is a rendered illustration of an example of an assembled small architectural premises automation device in a wall, similar to that shown in FIG. 6A.

Figure 7:
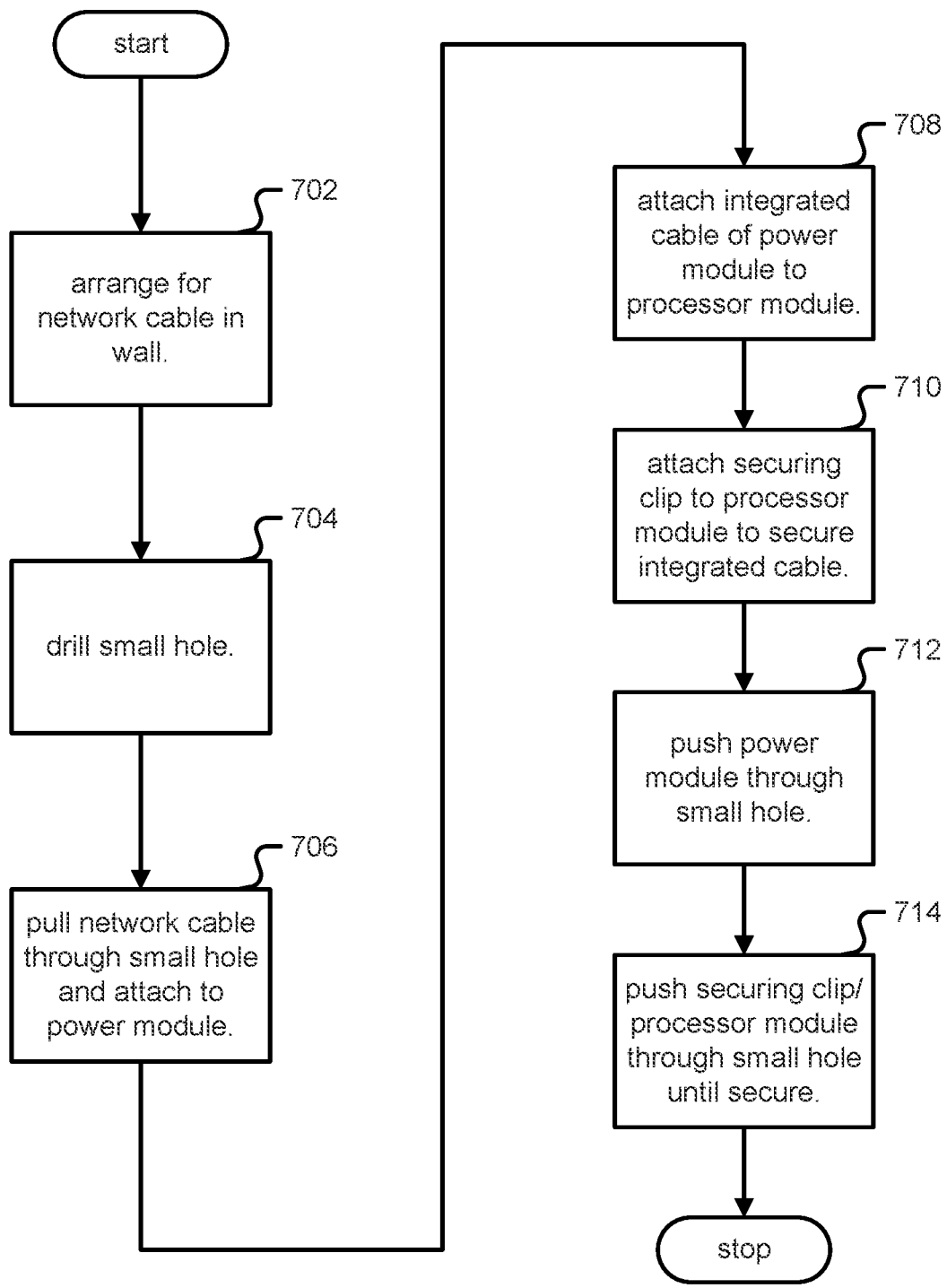
FIG. 7 is a flow diagram illustrating an embodiment of an installation process for a small architectural premises automation device.

FIG. 7 is a flow diagram illustrating an embodiment of an installation process for a small architectural premises automation device. Without limitation, the device described in FIG. 7 may be placed in any element of a building/premises, for example a ceiling or a floor, and a wall is used in discussion of FIG. 7 for illustration purposes.

In step (702), a construction/contractor arranges for a cable such as (506) in FIG. 5 to be placed in a building element such as a wall. For example, a cable may be webbed or magnet-locator placed inside a wall prior to drywall/wall covering is installed. In step (704) the construction/contractor drills a small hole. In one embodiment, the small hole is 1.125 inches or less in diameter.

In step (706), the cable is retrieved and/or fished through the small hole and attached to power module (206-iii). In step (708) an end of the integrated cable (508a) which may be hardwired to the power module (206-ii) is attached to the processor module (206-ii). The processor module (206-ii) may be plugged into the sensor module (206-i) at this stage.

In step (710) a securing clip (602) is attached to the processor module (206-ii) to secure the integrated cable end (508a) to the processor module (206-ii). The securing clip may also be used to provide a pressure fit for the processor module/sensor module in the small hole. In step (712) the power module (206-iii) is pushed through the small hole, and in step (714) the securing clip and processor module assembly is also pushed through the small hole until secure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
  a power module configured to accept power and data from a detachable network cable, wherein the power module may be inserted into a standard wall cavity via a small hole;

a processor module coupled to the power module using an integrated data and power cable, comprising a processor and configured to accept power from the detachable network cable for the processor, wherein the integrated data and power cable is hardwired to the power module and has a detachable end for the processor module, and wherein the processor module may be inserted into the standard wall cavity via the small hole;

a securing clip coupled to the processor module, wherein the securing clip secures the processor module in the small hole using a pressure fit, and wherein the securing clip secures the detachable end of the integrated data and power cable to the processor module; and a sensor module coupled to the processor module using a plug and receptacle pairing, comprising a sensor and configured to accept input from the sensor for the processor, wherein the sensor module may be inserted into the small hole, and wherein the sensor module is low-profile.

2. The system of claim 1, wherein the processor module is further configured to accept signal from a wireless network.

3. The system of claim 1, wherein the cable is a network cable and the processor module is further configured to accept signal from the cable for the processor.

4. The system of claim 1, wherein the small hole is greater than or equal to 1.125 inches in diameter.

5. The system of claim 1, wherein the small hole is between 1 inch and 5 inches in diameter.

6. The system of claim 1, wherein the small hole is less than or equal to 5 inches in diameter.

7. The system of claim 1, wherein the standard wall cavity is greater than or equal to 3.5 inches in depth.

8. The system of claim 1, wherein the cable follows a Power over Ethernet specification.

9. The system of claim 1, wherein the processor module is coupled to the power module via an integrated power and data cable that follows a published specification.

10. The system of claim 9, wherein the published specification is a USB Type-C specification.

11. The system of claim 1, wherein the sensor comprises a microphone.

12. The system of claim 1, wherein the sensor comprises a capacitive touch button.

13. The system of claim 1, wherein the sensor module may further comprise an output device.

14. The system of claim 13, wherein the output device is an LED.

15. The system of claim 13, wherein the output device is a multicolored LED for feedback.

16. The system of claim 15, wherein a color of the multicolored LED is associated with a contextual subsystem to control.

17. The system of claim 15, wherein a brightness of the multicolored LED is associated with a gradient of a contextual subsystem to control.

18. The system of claim 1, wherein the processor module is further configured to transmit data via the cable to an automation system.

19. The system of claim 1, wherein the processor module is further configured to transmit data via the cable to a speaker system.

20. The system of claim 1, wherein the sensor module is coupled to the processor module via a user-accessible plug and receptacle system.

21. The system of claim 1, wherein the sensor comprises a camera.

22. The system of claim 1, wherein the processor module is coupled to the power module in part by a securing clip.

23. The system of claim 22, wherein the securing clip holds an integrated data and power cable between the processor module and power module securely and holds the processor module securely in the small hole by pressure fit.

24. The system of claim 1, wherein the sensor module is no greater than 40 mm in diameter and no greater than 4 mm in depth.

* * * * *